(No Model.)
J. P. JOHNSON.
DRAFT EQUALIZER.
No. 260,207. Patented June 27, 1882.
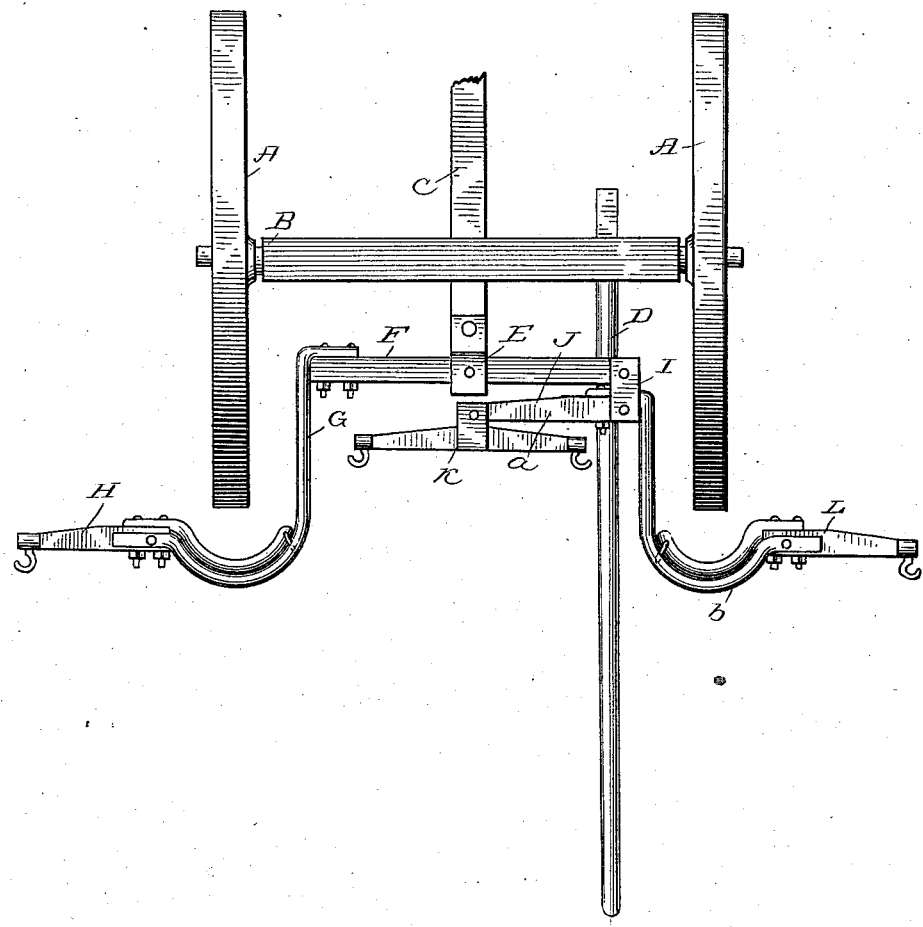

UNITED STATES PATENT OFFICE.

JAMES P. JOHNSON, OF VIRDEN, ILLINOIS.

DRAFT-EQUALIZER.

SPECIFICATION forming part of Letters Patent No. 260,207, dated June 27, 1882.

Application filed April 18, 1882. (No model.)

*To all whom it may concern:*

Be it known that I, JAMES P. JOHNSON, of Virden, in the county of Macoupin and State of Illinois, have invented a new and useful Improvement in Draft-Equalizers; and I do hereby declare that the following is a full, clear, and exact description of the same.

My invention relates to an improvement in devices for attaching horses to vehicles, and particularly to wheel-plows; and it consists in the peculiar construction of the device whereby the draft is materially lessened and equalized between the three horses commonly attached.

In the accompanying drawing, which represents a top view of a wheel or sulky plow with my improvement attached, A A represent the supporting-wheels of a sulky-plow; B, the axle; C, the plow-beam, and D the pole or tongue.

To the front of the plow-beam, which is mounted on the axle, is secured a clevis, E', to which is attached the cross-bar F by a pin passing through holes in the clevis and bar. The cross-bar F is thus mounted and pivoted immediately in front of the axle.

To one end of the bar F is rigidly attached an arm, G, which is bent outwardly a short distance and then at right angles, and to this arm is pivoted the whiffletree H. The arm G is necessarily bent forward a sufficient distance to clear the driving-wheel when bent at an angle. To the opposite end of the bar F is pivoted a link, I, and to this pivoted link is secured an arm, J, extending in one direction parallel to the bar F, this portion being marked *a*. To the end of the part *a* is a swinging whiffletree, K, to which the middle horse is attached. In the other direction the arm J is bent forward to a point beyond the wheels, where it is extended at right angles beyond the wheel, as indicated at *b*, and a whiffletree, L, attached.

It will be seen that the draft is directly from the axle, accomplishing a great saving in power, the horse on the right hand exerting his force through the long lever-arm G, properly proportioned to the length of the cross-bar F from its central pivot to the point where the arm J is attached. The draft of the team hitched to the pivoted arm J is from the point of attachment of link I, and the combined draft of this team is equalized by that of the third horse, whose draft is from the end of arm G.

This device is exceedingly simple in construction, and is efficient in operation, lightening the draft and thereby saving power.

Having described my invention, I claim—

In combination with a cross-bar, F, pivoted at or near the axle of a wheel-plow, a rigidly-attached bent arm, G, extending to a point in front of and outside one of the driving-wheels, and an arm, J, pivoted to said cross-bar F, and having the whiffletrees K L, as described.

In testimony whereof I have signed my name to this specification in the presence of two subscribing witnesses.

JAMES P. JOHNSON.

Witnesses:
F. H. MARTIN,
C. M. WALWORTH.